United States Patent Office 3,409,608
Patented Nov. 5, 1968

3,409,608
SUBSTITUTED DIBENZODIAZOCINES
John G. Topliss, West Caldwell, N.J., assignor to Schering Corporation, Bloomfield, N.J., a corporation of New Jersey
No Drawing. Filed Jan. 4, 1966, Ser. No. 518,560
10 Claims. (Cl. 260—239.3)

ABSTRACT OF THE DISCLOSURE

This invention pertains to substituted 5,6-dihydrodibenzo[b,f]diazocines, their use as mild tranquilizing agents, and to the processes for preparing such compounds. Specifically, an appropriately substituted N-(2-nitrophenyl)-2-benzoyl benzamide or an N-(2-benzoylphenyl)-2-nitrobenzamide is chemically reduced and certain reduction products then optionally converted to the appropriate 6-oxo-5,6-dihydrodibenzo[b,f]diazocines.

---

The invention relates to compositions of matter classified in the art of chemistry as substituted dibenzodiazocines and to processes for making and using such compositions.

The invention sought to be patented in its composition aspect is described as residing in the concept of a chemical compound having the molecular structure in which there is attached to a 5,6-dihydrodibenzo[b,f]diazocine nucleus, a substituent R in the 5-position, oxo or hydrogen in the 6-position, in the 2-position a chlorine atom, or its hereinafter disclosed equivalents wherein R is a member of the group consisting of hydrogen, lower alkyl and di-lower-alkyl-amino lower alkyl, or its hereinafter disclosed equivalent, said dibenzodiazocine having its $c$ and $e$ bonds joined to a member of the group consisting of

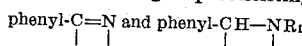

wherein $R_1$ is a member of the group consisting of hydrogen and lower alkanoyl.

The invention sought to be patented in its process aspect is described as residing in the concept of selectively reducing at an elevated temperature a member of the group consisting of an N-(2-nitrophenyl)-N-$R_2$-2-benzoyl-benzamide or an N-(2-benzoylphenyl)-N-$R_3$-2-nitrobenzamide with a heavy metal in an acid medium in which the metal will dissolve wherein $R_2$ and $R_3$ represent hydrogen or lower alkyl, with the proviso that when $R_3$ is hydrogen, the product formed is then heated with a strong acid at elevated temperature, until a substantial quantity of a 6-oxo-5,6-dihydrodibenzo[b,f]diazocine is formed.

As used herein the term "lower alkyl" includes straight and branched chain alkyl radicals having from 1 to 6 carbon atoms such as methyl, ethyl, propyl, butyl, pentyl, hexyl and their branched chain isomers. The cycloalkyl radicals having from 3 to 6 cyclic atoms such as cyclopropyl, cyclobutyl, cyclopentyl and cyclohexyl and considered to be the full equivalents of the lower alkyl substituent.

The term "di-lower alkylaminolower alkyl" means a tertiary amino group having two lower alkyl groups attached to the N-atom as well as bivalent lower alkyl group, "lower alkyl" being as above defined. Included within such term are 2-dimethylaminoethyl, 3-dimethylaminopropyl, 2-dimethylaminopropyl, 4-dimethylaminobutyl, 2-diethylaminoethyl, 3-diethylaminopropyl and the like. The two lower alkyl groups on the N-atom may be joined together to form with the nitrogen atom a heterocycle having at least 5 cyclic atoms such as pyrrolidino, piperidino, homopiperidino. These cyclic amino groups are considered to be the full equivalents of di-lower alkylamino. It is apparent that the tangible embodiments of this invention include 1,5-diazocines having the nucleus represented by Formula IA and 1,4-diazocines represented by Formula IIA.

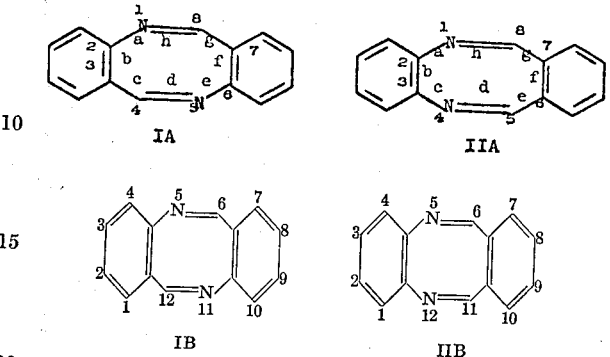

For identification of the positions of the two nitrogen atoms the diazocine ring itself is numbered as shown in Formulae IA and IIA. The positions of the benzo groups are identified by their respective common bonds with the diazocine ring, said bonds being labelled ($a$ to $h$) as in Formulae IA and IIA. The peripheral numbering systems of the dibenzodiazocines, whereby the position of substituents may be identified, are shown in Formulae IB and IIB. It is obvious that the tangible embodiments of this invention are 5,6-dihydrodibenzo[b,f]diazocines having the nucleus represented by Formulae I or II, and the 11,12-dihydro analogs thereof.

To prepare 1,5-diazocines of this invention the following sequence of reactions is preferably employed:

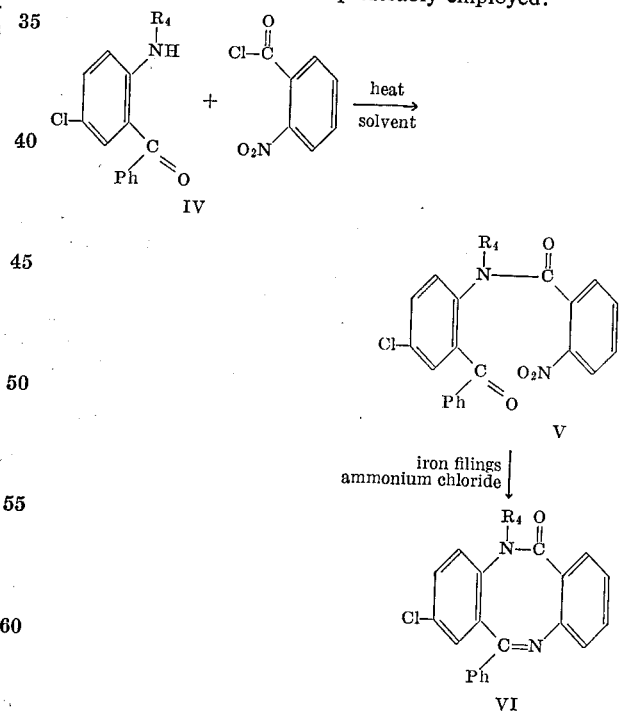

In the foregoing reaction sequence, $R_4$ is lower alkyl, preferably methyl and Ph represents phenyl.

The starting material, a 2-aminobenzophenone (III) is N-acylated with a 2-nitrobenzoyl chloride (IV) by admixing and heating in an inert organic solvent at an elevated temperature. Suitable solvents for this reaction are the aromatic hydrocarbons such as toluene, xylene, cymene and the like and reaction temperature obtained preferably by reflux. The 2-(N-2-nitrobenzoyl)-aminobenzophenone (V) so formed is isolated and subjected to selective reduction of the nitro group to an amino group whereby cyclization occurs in situ with formation of a tangible embodiment of this invention as represented by the 1,5-diazocine, VI. The selective reduction is effected by chemical means utilizing agents known to be capable of reducing aromatic nitro groups to amino groups but non-reactive to keto groups. Representative of such reducing agents are heavy metals in the presence of acid with which the metal will react and produce hydrogen. A selected group of such agents are the metals iron, zinc and tin in various states of subdivision like filings, granules or in the case of tin the "mossy form." Aqueous hydrochloric acid is the preferred acid medium, either as such or as produced from the dissociation of ammonium chloride. Ammonium chloride and iron filings are a particularly effective reagent combination.

The selective reduction described hereinabove is carried out in a polar solvent medium in which water is present. I prefer to use higher alkanols and glycol-ethers containing water as the reaction medium. In particular the monomethylether of ethyleneglycol is a particularly advantageous solvent for the reaction. After all the reactants have been brought together, the reaction mixture is heated at an elevated temperature, preferably at reflux, to insure completion of reaction. The cyclized product, VI, is isolated from the reaction mixture by conventional means.

When $R_4$ is lower alkyl as set forth in the foregoing reaction scheme and description, the conversion of V to VI occurs in essentially a single step. The product of the reduction of V is the cyclized product VI. For some reason, presently unknown, when $R_4$ is hydrogen the reductive step does not produce a cyclized product directly in any substantial yield, but produces an intermediate amino analog, VII, which is transformed into the cyclic product VI by heating said amino compound in an inert organic solvent at an elevated temperature in the presence of a strong acid. Representative of the organic solvent media are the aromatic hydrocarbons such as toluene, xylene, cymene and the like and the strong acid catalyst is preferably para toluene sulfonic acid. Other acids which may be used equally well are inorganic acids such as perchloric, hydrochloric and sulfuric acid. It is evident, therefore, that when the substituent on the 5-position of the 1,5-diazocine compound of this invention is desirably hydrogen, an extra step is required to effect cyclization as compared with the analogous compound bearing an alkyl group in the 5-position. These compounds bearing a hydrogen atom in the 5-position are useful in their own right as therapeutic agents as will be described hereinafter and are also useful as intermediates in producing alkylation derivatives of the 5-position nitrogen atom such as the dimethylamino ethyl analog.

The 1,4-diazocines of this invention are prepared preferably by the following sequence of reactions:

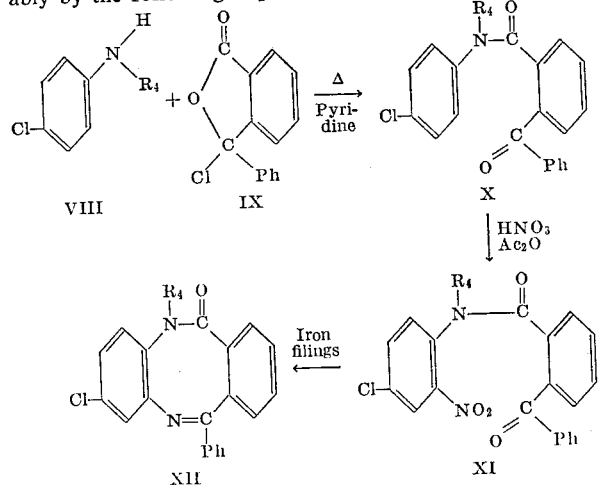

In the foregoing sequence, as was similarly defined in the preparation of the 1,5-diazocines, $R_4$ is a lower alkyl group, preferably methyl while Ph represents phenyl.

The starting reactants are a 4-chloro aniline (VIII) and the acid chloride of a 2-benzoyl benzoic acid, sometimes represented in the manner of IX. Acylation of VIII by IX according to conventional techniques such as by heating the reactants together in a basic medium such as pyridine gives rise to the amide X. At this stage, it is necessary to provide means for the introduction of an amino group into the position vicinal to the carbon atom bearing the aromatic amino function. This is accomplished by nitrating the amide, preferably in an anhydrous medium such as acetic anhydride whereby there is formed the corresponding nitro compound, XI. This substance, XI, upon selective reduction with iron and ammonium chloride, for example, as described heretofore, gives rise to the cyclized product, XII, a 1,4-diazocine. In this reaction sequence also, if $R_4$ is hydrogen, the product of the reduction of the nitro intermediate is an amine XIII which is transformed into the end product XII by heating in the presence of an acid catalyst.

The methods set forth hereinabove give rise to tangible embodiments of this invention having an unsaturation between the 11- and 12-positions; said embodiments being depicted by the following structural formulae representing the 1,5-diazocine and 1,4-diazocine type respectively:

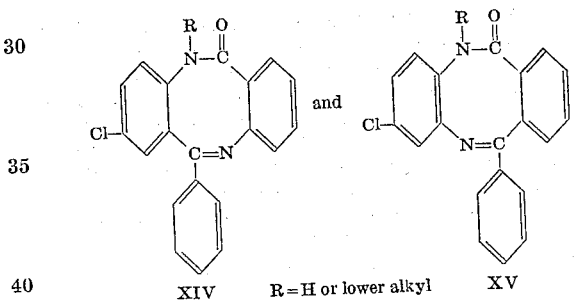

XIV     R = H or lower alkyl     XV

The 11,12-dihydro analogs of XIV and XV are prepared by catalytic hydrogenation of the unsaturated compound preferably by means of hydrogen and platinum oxide in acetic acid; although other conventional means for selectively reducing a C=N double bond in the presence of an amide can be equally applied. This selective reduction gives rise to further tangible embodiments of this invention as represented by XVI and XVII:

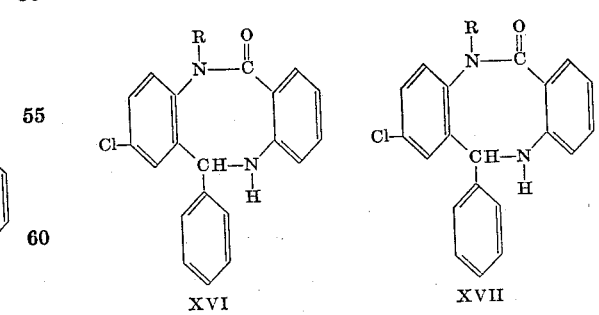

XVI          XVII

The —NH group in each of XVI and XVII may be acylated with a lower alkanoyl halide or anhydride in a basic medium like pyridine to yield the corresponding N-acyl derivative. Reaction preferentially takes place on this nitrogen atom rather than the nitrogen atom in the 5-position in view of the lower bascity of the latter.

When the reduction of the 11,12-bond in either the 1,5 or 1,4-diazocines is conducted by chemical means such as with lithium aluminum hydride, for example, simultaneous reduction of the oxo group at the 6-position occurs resulting in compounds of the following structures:

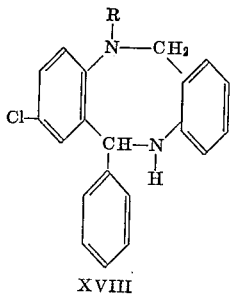

XVIII

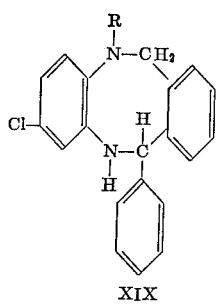

XIX

Both XVIII and XIX lend themselves to acylation by virtue of their respective —NH groups. With these compounds, however, if R is hydrogen, acylation will occur on the nitrogen atom in the 5-position as well. The 11,12-position in XVIII and XIX can be dehydrogenated, so as to introduce an 11,12-unsaturated linkage, by selective oxidation with suitable reagents such as silver oxide or manganese dioxide.

The tangible embodiments of the invention represented by the foregoing exhibit useful properties manifest by depression of the central nervous system as determined by pharmacological evaluation. In particular, when R is lower alkyl, preferably methyl, and $R_1$ is hydrogen, the tangible embodiments are of value as mild tranquillizing agents and muscle relaxants of relatively low toxicity. These tangible embodiments are preferably administered orally to the mammalian host via the oral route in any of the usual pharmaceutical dosage forms, such as tablets, powders, elixirs, solutions, syrups and the like in a dose range of from about 0.5 to 15 mg. per kg. body weight, one to three times daily. The dose and frequency is dependent upon the condition being treated. Although oral administration is preferred, the compounds may also be administered via the parenteral route in the form of aqueous suspensions or solutions in a dose range of about 0.1 to 3 mg. per kg. of body weight, one to three times daily.

In the foregoing compounds, when R is hydrogen, especially where the 11,12-bond is unsaturated, a useful intermediate is provided which lends itself to alkylation so as to introduce a di-lower alkylamino lower alkyl at the 5-position. The alkylation is carried out in the conventional manner utilizing an amino alkyl halide, such as, for example, dimethylaminoethyl chloride in an inert solvent in the presence of a basic condensing agent. Typical solvents for this reaction are benzene, toluene, ether, dioxane and the like. Representative condensing agents are sodium hydride, sodium methoxide, sodium ethoxide and the like. The 5-dialkylaminoalkyl product, which is a tangible embodiment of this invention in both the 1,5- and 1,4-diazocine series, may be subjected to any of the transformations described heretofore such as catalytic reduction to the 11,12-dihydro analog, chemical reduction to the 6-desoxy analog, and acylation of the free amino group present in the saturated ring.

The dialkylaminoalkyl compounds prepared as above, administered either as a free base or non-toxic pharmaceutically acceptable acid addition salt (of which hydrochloride, sulfate, and maleate are representative), exhibit particular central nervous system effects as determined by pharmacological evaluation which render them useful as anti-tremor agents. They accordingly may be used in mild cases of Parkinsonism, and other neurologic disease characterized by rigidity and tremor. These anti-tremor compounds are preferably administered via the oral route in the form of tablets, capsules, elixers and the like. For acute conditions, parenteral administration in the form of solutions or suspensions may be indicated. An effective oral therapeutic dose range is 0.2 to 12 mg. per kg. of body weight, one to three times daily while parenterally the range may be narrowed to 0.05 to 1.5 mg. per kg. The particular dose and frequency is dependent upon the condition being treated.

It is readily apparent to one skilled in the art that a di-lower alkylamino group wherein the alkyl groups are bonded together to form a heterocycle with the nitrogen will produce essentially the same effect as the open chain analogs. Such cyclic amino substituents are pyrolidino-lower alkyl, morpholino-lower alkyl, piperazino-lower alkyl and others of equivalent nature. These cyclic amino lower alkyl groups are considered to be the full equivalents of the di-lower alkyl amino-lower alkyl groups described herein. Tangible embodiments of the invention possessing such cyclic amino groups exhibit essentially the same properties as their open chain analogs, differing perhaps in degree of untility rather than kind.

The compounds representing the tangible embodiments of the invention have all been described as having a chlorine atom in the 2-position. It is apparent that other like substituents in the 2-position or elsewhere in any of the three aromatic hydrocarbon rings of the tangible embodiments are prepared by analogous methods described herein but merely altering the appropriate starting material. Such other substituents, in addition to chloro are bromo, trifluoromethyl and lower alkyl, such as methyl. In addition, the rings may be unsubstituted and thus bear hydrogen only in one or more positions. The substituents may be present in practically any position on any or all of the three aromatic rings. Applying the methods of synthesis described herein to such other analogs and position isomers, with modification as may be necessary and would be apparent to one skilled in the art, compounds having the molecular skeleton described herein, but with one or more substituents of the group represented by Cl, Br, $CF_3$ and methyl are obtained. These compounds exhibit essentially the same properties as the 2-chloro compounds described herein differing in degree only, and as such the full equivalents of the tangible embodiments having the 2-chloro substituent.

The following examples are illustrative of the methods employed for preparing the tangible embodiments of this invention.

EXAMPLE 1

2-chloro-5,6-dihydro-5-methyl-6-oxo-12-phenyl-dibenzo[b,f][1,5]diazocine

Reflux a solution of 12.5 g. of 2-methylamino-5-chlorobenzophenone and 10.0 g. of o-nitrobenzoyl chloride in 100 ml. of toluene for 16 hrs. Concentrate the solution until precipitation begins, then dilute with petroleum ether. Cool the solution, filter off the product, wash with petroleum ether and air dry to give 20.1 g. of 2 - (N - methyl - 2 - nitrobenzamido) - 5-chlorobenzophenone, M.P. 136–140°. Recrystallize from ethyl acetate to give pure material, M.P. 142–143°. To a stirred refluxing solution of 2.0 g. of 2 - [N - methyl - 2 - nitrobenzamido] 5-chlorobenzophenone add 1.6 g. of ammonium chloride in 20 ml. of 2-methoxyethanol and 5 ml. of water, add 1.6 g. of iron fillings portionwise over 1.5 hrs. Reflux for an additional period of 1.5 hrs., filter the reaction mixture, wash the filter cake with hot methanol and evaporate the combined filtrates to dryness. Recrystallize the residue from methylene chloride-hexane to give 1.2 g. of product, M.P. 206–210°. Recrystallize further from acetone-petroleum ether to give the product of this example, M.P. 213–214°.

EXAMPLE 2

2-chloro-5,6-dihydro-6-oxo-12-phenyldibenzo-[b,f][1,5]diazocine

Reflux a solution of 45.2 g. of 2-amino-5-chlorobenzophenone and 38.9 g. of o-nitrobenzoyl chloride in 300 ml. of toluene for 16 hrs. Concentrate the solution to about half volume and dilute with 300 ml. of petroleum ether. Collect the crude product by filtration, wash with petroleum ether and air dry; yield 74.4 g. of 5-chloro-2-(o-nitrobenzamido)-benzophenone M.P. 142–5°. Purify by recrystallization from methanol to give 61.4 g., M.P. 159–162°. To a stirred, refluxing solution of 26.9 g. of 5 - chloro-2-(o-nitrobenzamido)-benzophenone and 23.7 g. of ammonium chloride in 220 ml. of 2-methoxyethanol and 55 ml. of water add 23.7 g. of iron filings, portionwise over 1.5 hr. Reflux for an additional period of 1.5 hr. then filter the reaction mixture, and wash the filter cake with hot methanol. Concentrate the combined filtrates to a small volume and dilute with water. Filter off the crude product, air dry and recrystallize from methylene chloride-hexane to give 16.9 g. of 2-(2-aminobenzamido)-5-chlorobenzophenone, M.P. 151–153°. Reflux a stirred solution of this material in 1700 ml. of xylene containing 1.7 g. of p-toluenesulfonic acid for 6.5 hr. with removal, dropwise of 900 ml. of solvent via a Dean Stark separator. Reflux the remaining solution for 16 hr. more, concentrate to about 200 ml. and add hexane. Collect the crude product which separates out, wash with hexane and air dry to give 17.2 g. of material, M.P. 160–174°. Recrystallize from methylene chloride-hexane to give the product of this example, 8.7 g., M.P. 217–220°.

EXAMPLE 3

2-chloro-5,6-dihydro-5-methyl-6-oxo-11-phenyl-dibenzo[b,f][1,4]diazocine

Heat a solution of 104.5 g. o-benzoylbenzoic acid and 70.2 g. of oxalyl chloride in 50 ml. of benzene on a steam bath for 1.5 hr. Evaporate the solvent and excess of oxalyl chloride and treat the chilled residue with a solution of 50.0 g. of p-chloro-N-methylaniline in 250 ml. of pyridine. Reflux the reaction mixture overnight, cool, dilute with water (250 ml.) and acidify with 200 ml. of concentrated hydrochloric acid. Extract with ether and then with chloroform. Evaporate the dried chloroform solution and crystallize the residual oily solid from methylene chloride-hexane to give 30 g. of o-benzoyl-N-(p-chlorophenyl)-N-methylbenzamide, M.P. 139–141°.

To a stirred, refluxing solution of 2.0 g. of this compound, and 1.6 g. of ammonium chloride in 25 ml. of 2-methoxyethanol and 5 ml. of water, add 1.6 g. of iron filings in small portions over 75 minutes. Reflux for 16 hrs., filter the reaction mixture and evaporate the filtrate to dryness. Dissolve the residue in hot acetone, filter the solution free of insoluble salts and evaporate to dryness. Dissolve the residual oil (1.8 g.) in 15 ml. of benzene and chromatograph on a column of 30 g. of aluimina. Elute with benzene to give 0.7 g. of a yellow oil. Allow to stand until solid and crystallize the solid from methylene chloride-hexane to give the product of this example, M.P. 154–155°.

EXAMPLE 4

2-chloro-5-methyl-6-oxo-12-phenyl-5,6,11,12-tetrahydrodibenzo[b,f][1,5]diazocine Dissolve 1.0 g. of 2-chloro-5,6-dihydro-5-methyl-6-oxo-12-phenyldibenzo[b,f][1,5]diazocine in 150 ml. of glacial acetic acid and shake the solution in an atmosphere of hydrogen at room temperature and a pressure of 60 p.s.i. in the presence of 0.10 g. of platinum oxide over a period of 2 hr. Filter off the catalyst, evaporate the filtrate to dryness and crystallize the residue from methylene chloride-hexane to give the product of this example, M.P. 244–246°.

EXAMPLE 5

2-chloro-5-methyl-6-oxo-11-phenyl-5,6,11,12-tetrahydrodibenzo[b,f][1,4]diazocine Dissolve 1.0 g. of 2 - chloro - 5,6 - dihydro - 5-methyl-6 - oxo-11-phenyl-dibenzo[b,f][1,4]diazocine in 150 ml. of glacial acetic acid and shake the solution in an atmosphere of hydrogen at room temperature and a pressure of 60 p.s.i. in the presence of 0.10 g. of platinum oxide over a period of 2 hr. Filter off the catalyst, evaporate the filtrate to dryness and crystallize the residue from methylene chloride-hexane to give the product of this example.

EXAMPLE 6

12-acetyl-2-chloro-5-methyl-6-oxo-11-phenyl-5,6,11,12-tetrahydrodibenzo[b,f][1,4]diazocine Reflux a solution of 3.2 g. of 2 chloro - 5 - methyl-6-oxo - 11 - phenyl-5,6,11,12-tetrahydrodibenzo[b,f][1,4] diazocine and 1.9 g. of acetic anhydride in 100 ml. of toluene for 7 hr. and then evaporate to dryness. Recrystallize the residue from ethyl acetate-hexane to give the product of this example.

EXAMPLE 7

11-acetyl-2-chloro-5-methyl-6-oxo-12-phenyl-5,6,11,12-tetrahydrodibenzo[b,f][1,5]diazocine Reflux a solution of 3.2 g. of 2-chloro-5-methyl-6-oxo-12 - phenyl - 5,6,11,12 - tetrahydrodibenzo[b,f][1,5] diazocine and 1.9 g. of acetic anhydride in 100 ml. of toluene for 7 hrs. and evaporate to dryness. Recrystallize the residue from ethyl acetate-hexane to give the product of this example, 1.8 g., M.P. 229–230°.

EXAMPLE 8

2-chloro-5-methyl-12-phenyl-5,6,11,12-tetrahydrodibenzo[b,f][1,5]diazocine

Add 3.9 g. of 2-chloro-5,6-dihydro-5-methyl-6-oxo-12-phenyldibenzo[b,f][1,5]diazocine in small portions to a stirred suspension of 1.65 g. of lithium aluminum hydride in 400 ml. of anhydrous ethyl ether and reflux the mixture for 18 hr. Cool, and treat with successive portions of 1.5 ml. of water, 1.5 ml. of 15% aqueous sodium hydroxide solution and 4.5 ml. water. Stir the mixture for 30 minutes, filter off the salts and wash thoroughly with ethyl ether. Evaporate the ether filtrates and crystallize the residual yellow oil from hexane and then from acetone-petroleum ether to give 2.0 g. of the product of this example, M.P. 132–133°.

EXAMPLE 9

11-acetyl-2-chloro-5-methyl-12-phenyl-5,6,11,12-tetrahydrodibenzo[b,f][1,5]diazocine Reflux a solution of 1.0 g. of 2-chloro-5-methyl-12-phenyl-5,6,11,12 - tetrahydrodibenzo[b,f][1,5]diazocine and 0.76 g. of acetic anhydride in 50 ml. of toluene for 6.5 hr., concentrate to ca 25 ml., dilute with petroleum ether until cloudy and chill. Filter off the white crystalline solid which separates to give the product of this example, 0.67 g., M.P. 152–154°.

EXAMPLE 10

2-chloro-5,6-dihydro-5-(2-dimethylaminoethyl)-6-oxo-12-phenyldibenzo[b,f][1,5]diazocine Reflux a stirred mixture of 2.4 g. of 2-chloro-5,6-dihydro-6-oxo-12-phenyldibenzo[b,f][1,5]diazocine. 0.21 g. of sodium hydride (as a 53.3% dispersion in mineral oil) in 100 ml. of benzene for one hour and then cool. Add a solution of 1.0 g. of β-dimethylaminoethyl chloride in 10 ml. of benzene, reflux the reactive mixture overnight, cool and add 50 ml. of water dropwise. Separate the benzene layer, re-extract the aqueous layer with benzene and extract the combined benzene layers with 10% hydrochloric acid. Basify the acidic extracts with ammonium hydroxide, extract with chloroform and evaporate the dried chloroform extracts. Crystallize the residue from acetone-ether-petroleum ether to give the product of this example M.P. 172–173°.

EXAMPLE 11

2-chloro-5,6-dihydro-5-(3-dimethylaminopropyl)-6-oxo-12-phenyldibenzo[b,f][1,5]diazocine Reflux a stirred mixture of 5.4 g. of 2-chloro-5,6-dihydro-6-oxo-12-phenyldibenzo[b,f][1,5]diazocine and 0.47 g. of sodium hydride (as a 53.3% dispersion in mineral oil) in 225 ml. of benzene for 1 hr., cool, and treat with 2.6 g. of 3-dimethylaminopropyl chloride in 25 ml. of benzene. Reflux for 16 hr., cool, dilute with 115 ml. of water and separate the benzene layer. Re-extract the aqueous layer with benzene and extract the combined benzene layers with 10% hydrochloric acid. Basify the acidic layer with ammonium hydroxide solution and extract with chloroform. Evaporate the dried chloroform extracts to give 3.9 g. of the crude product in the form of a highly viscous yellow oil. Dissolve the oil in the minimum quantity of warm acetone, add an acetone solution of 1 g. of maleic acid and allow to stand. Filter off the crude maleate and recrystallize from ethyl acetate-acetone to give the product of this example as its maleate salt, M.P. 188–189°.

EXAMPLE 12

2-chloro-5-(β-dimethylaminoethyl)-6-oxo-12-phenyl-5,6,11,12-tetrahydrodibenzo[b,f][1,5]diazocine Starting with the product of Example 10, follow the procedure of Example 4 to obtain the product of this example.

EXAMPLE 13

2-chloro-5-(β-dimethylaminoethyl)-12-phenyl-5,6,11,12-tetrahydrodibenzo[b,f][1,5]diazocine Starting with the product of Example 10, follow the procedure of Example 8 to obtain the product of this example.

EXAMPLE 14

11-acetyl-2-chloro-5-(β-dimethylaminoethyl)-6-oxo-12-phenyl-5,6,11,12-tetrahydrodibenzo[b,f][1,5]diazocine Starting with the product of Example 12 follow the procedure of Example 7 to obtain the product of this example.

EXAMPLE 15

11-acetyl-2-chloro-5-(β-dimethylaminoethyl)-12-phenyl-5,6,11,12-tetrahydrodibenzo[b,f][1,5]diazocine Starting with the product of Example 13 follow the procedure of Example 9 to obtain the product of this example.

EXAMPLE 16

2-chloro-5,6-dihydro-5-methyl-12-phenyldibenzo[b,f][1,5]diazocine

Add a solution of 1.5 g. of sodium hydroxide in 10.5 ml. of water to a suspension of 3.35 g. of 2-chloro-5-methyl-12-phenyl-5,6,11,12-tetrahydrodibenzo[b,f][1,5]-diazocine in a solution of 3.40 g. of silver nitrate in 1 ml. of ethanol and 10 ml. of water. Shake the reaction mixture at room temperature for 18 hrs. Filter off the solids and extract these with hot dichloromethane. Wash the cold extract with water, dry and evaporate the solvent. Crystallize the residue from acetone-petroleum ether to give the product of this example.

I claim:

1. A compound of the group consisting of 2-chloro-5,6 - dihydro - 5 - R - 6X - 12 - phenyldibenzo[b,f][1,5]diazocine, 2-chloro-5,6-dihydro-5-R-6X-11 - phenyldibenzo-[b,f][1,4]diazocine, 2-chloro-5,6,11,12-tetrahydro-5-R-6-X-11-R$_1$-12-phenyldibenzo[b,f][1,5]diazocine, 2-chloro-5,6,11,12 - tetrahydro - 5 - R - 6 - X - 11 - phenyl - 12 - R$_1$-dibenzo[b,f][1,4]diazocine and the non-toxic parmaceutically acceptable acid addition salts thereof wherein: R is a member of the group consisting of hydrogen, lower alkyl, and

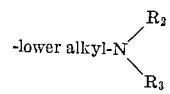

wherein R$_2$ and R$_3$ are each lower alkyl and when taken together with the nitrogen atom to which they are attached form a heterocycle selected from the group consisting of pyrrolidino, piperidino and homopiperidino, X is a member of the group consisting of H$_2$ and oxo, and R$_1$ is a member of the group consisting of hydrogen and lower alkanoyl.

2. A 5,6-dihydrodibenzo[b,f][1,5]diazocine of claim 1 wherein R is lower alkyl and X is oxo.

3. A compound of claim 2 wherein R is methyl.

4. A 5,6-dihydrodibenzo[b,f][1,5]diazocine of claim 1 wherein R is hydrogen and X is oxo.

5. A 5,6-dihydrodibenzo[b,f][1,4]diazocine of claim 1 wherein R is lower alkyl and X is oxo.

6. A compound of claim 5 wherein R is methyl.

7. A 5,6,11,12-tetrahydrodibenzo[b,f][1,5]diazocine of claim 1 wherein R is lower alkyl, X is oxo and R$_1$ is hydrogen.

8. A compound of claim 7 wherein R is methyl.

9. A 5,6-dihydrodibenzo[b,f][1,5]diazocine of claim 1 wherein R is di-lower alkylamino lower alkyl and X is oxo.

10. A compound of claim 9 wherein R is 2-dimethylaminoethyl.

References Cited

UNITED STATES PATENTS 3,243,428    3/1966    Metlesics et al. _____ 260—239
3,243,430    3/1966    Metlesics et al. _____ 260—239

HENRY R. JILES, *Primary Examiner.*

R. T. BOND, *Assistant Examiner.*